Oct. 6, 1959  R. S. MacCAFFRAY, JR  2,907,193
PILE CUTTING LOOP FORMER

Filed July 2, 1958  7 Sheets-Sheet 1

INVENTOR
Rex S. MacCaffray, Jr.
BY
ATTORNEYS.

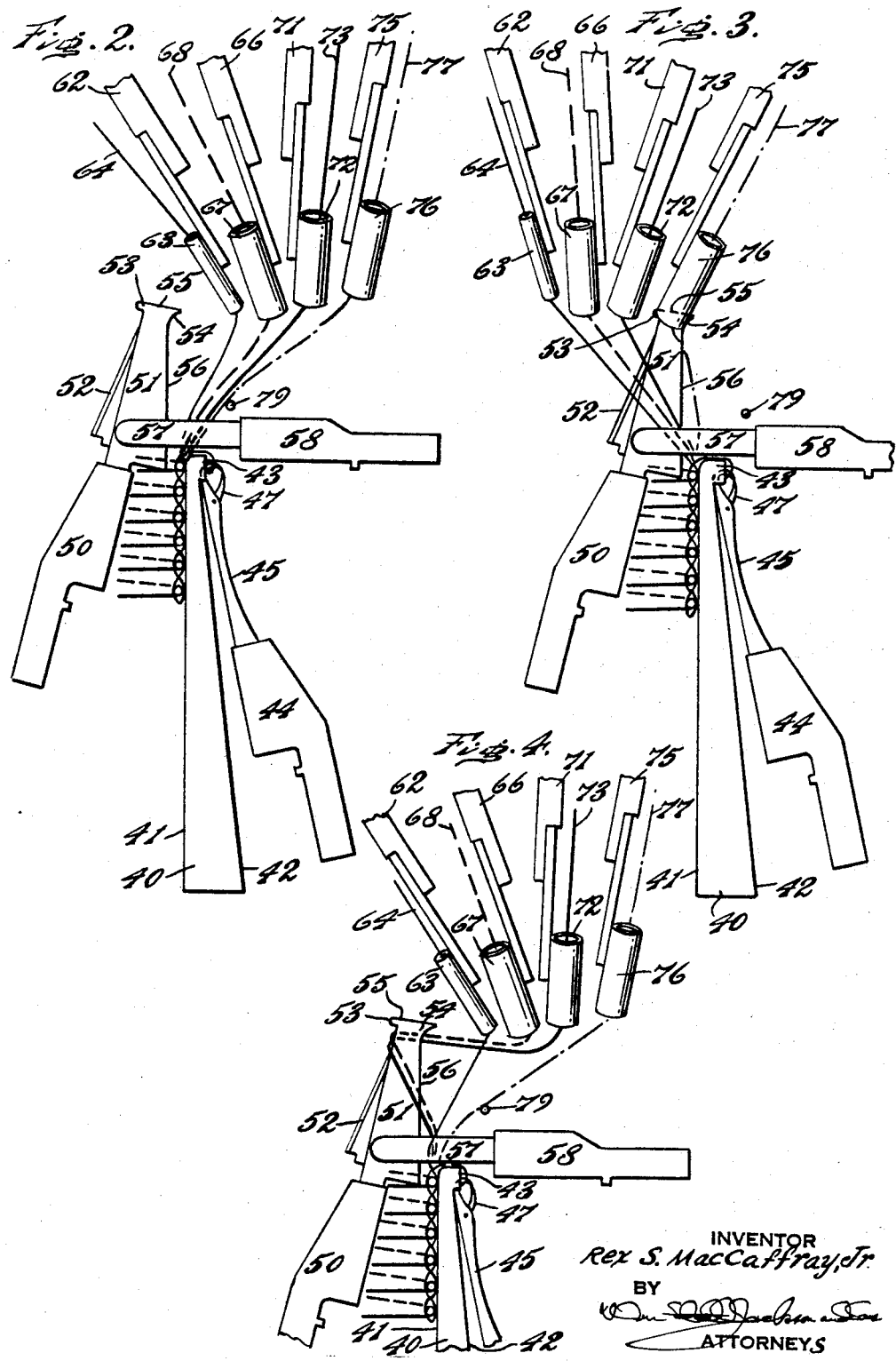

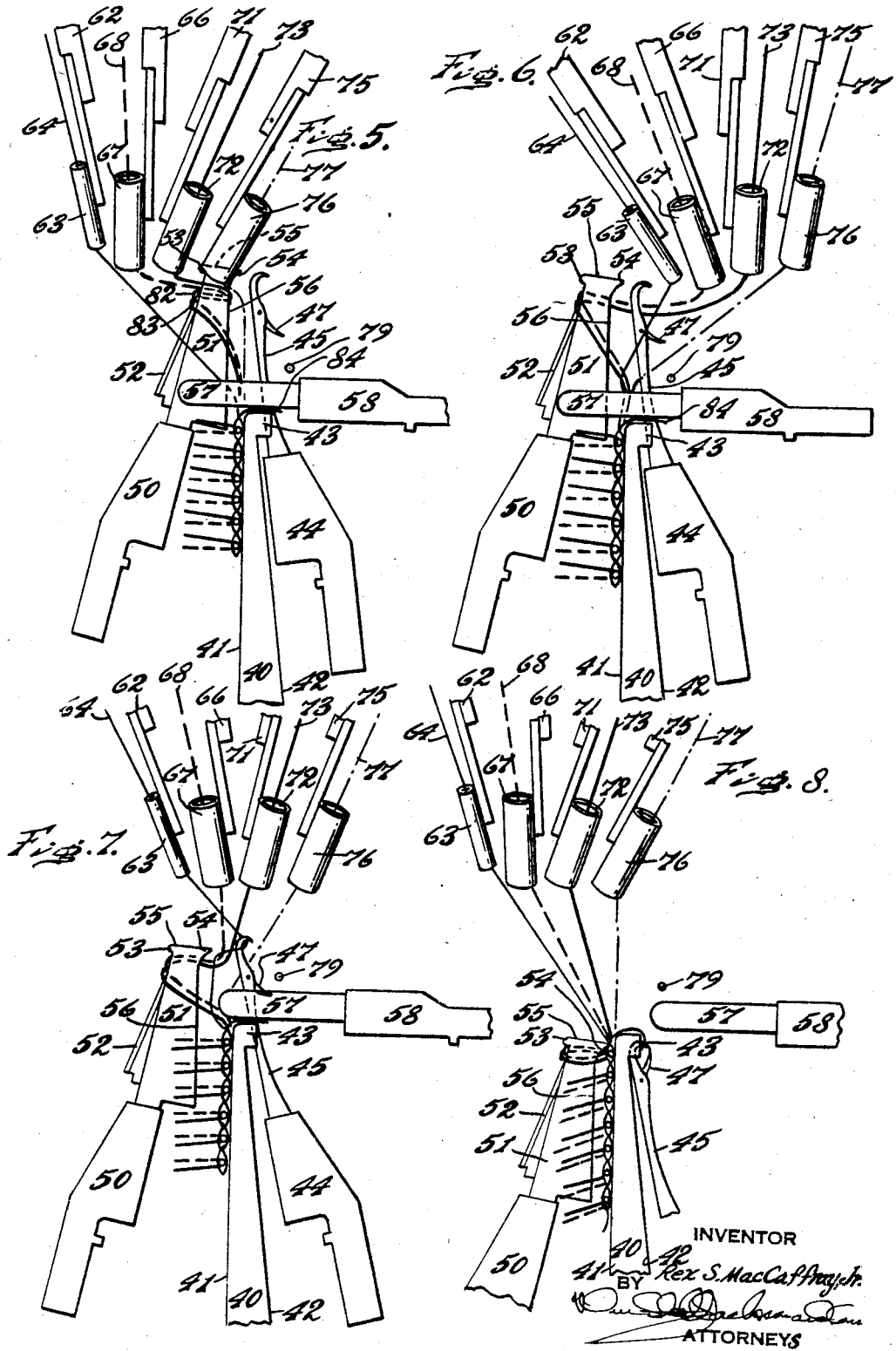

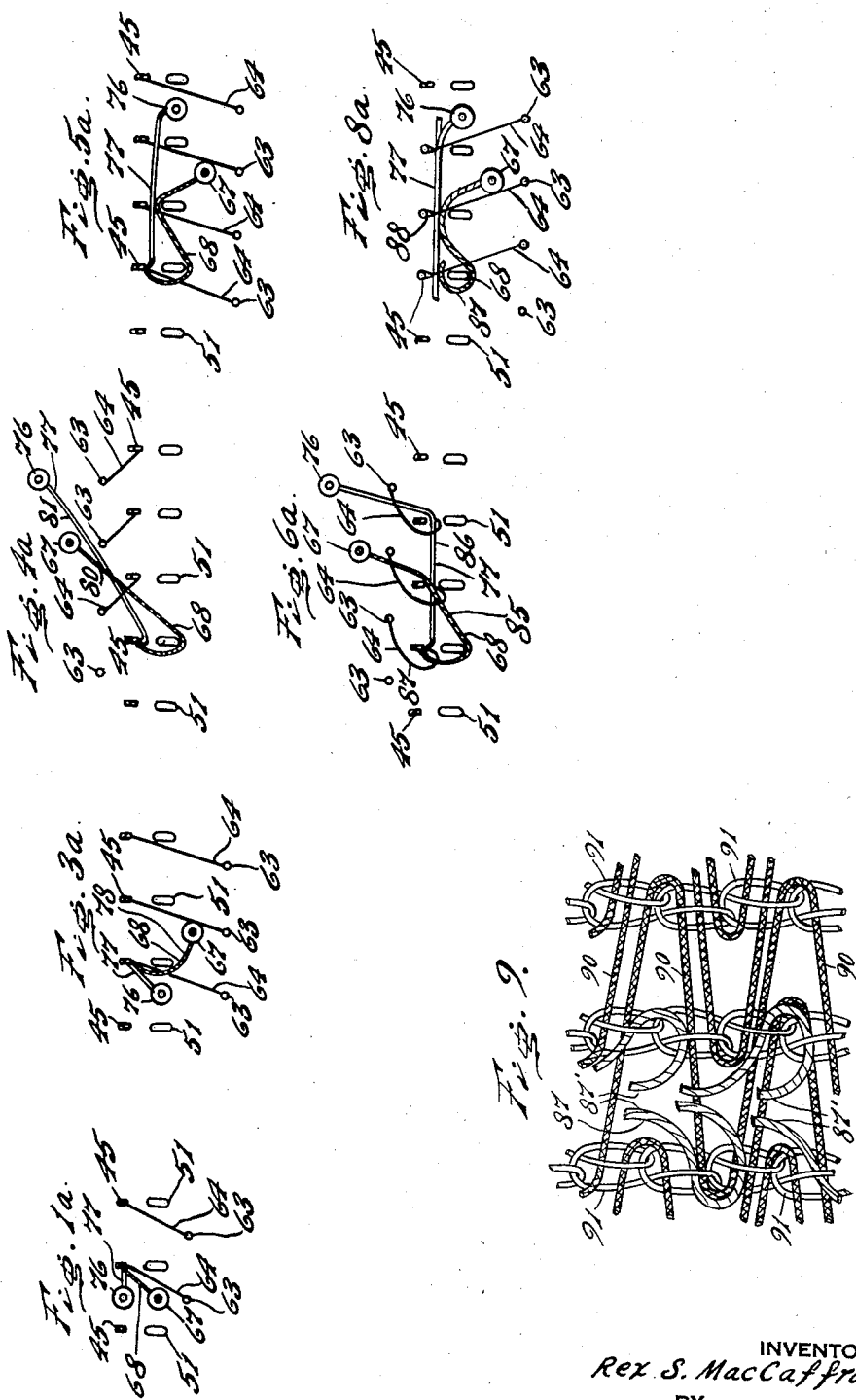

Oct. 6, 1959

R. S. MacCAFFRAY, JR 2,907,193

PILE CUTTING LOOP FORMER

Filed July 2, 1958

INVENTOR
Rex S. MacCaffray, Jr.
BY
ATTORNEYS.

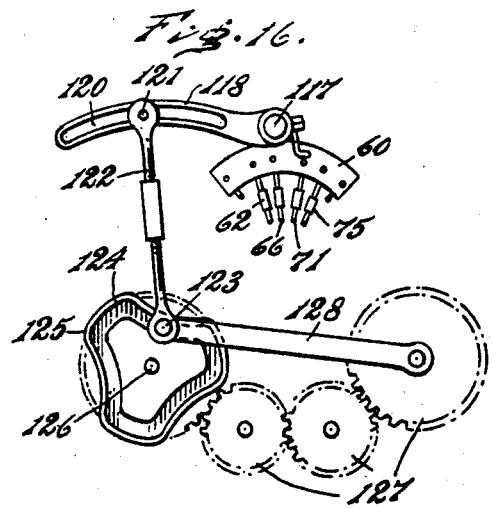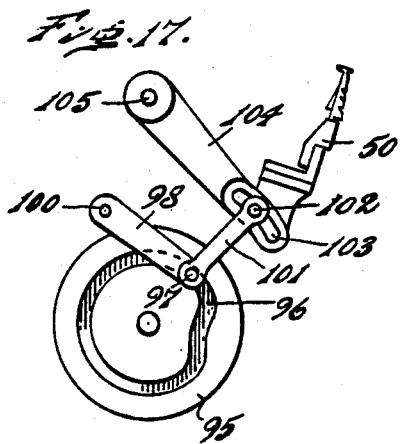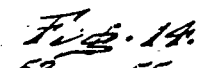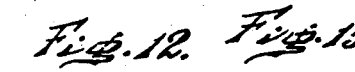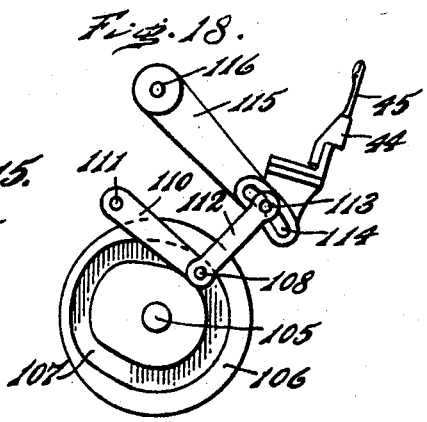

United States Patent Office 2,907,193
Patented Oct. 6, 1959

2,907,193

PILE CUTTING LOOP FORMER

Rex S. MacCaffray, Jr., Boiling Springs, Pa., assignor to C. H. Masland and Sons, Carlisle, Pa., a corporation of Pennsylvania Application July 2, 1958, Serial No. 746,123

2 Claims. (Cl. 66—91)

The present invention relates to apparatus for warp knitting of cut pile fabric.

The present application is a continuation-in-part of my copending application Serial No. 66,312, filed June 18, 1957, for Cutting Plush Point for Carpet Knitting.

A purpose of the invention is to hold the fabric being knitted against the fabric engaging surfaces of the trick plate by the heels of the cutting plush points so that the fabric does not move forward and damage the needles when the needles advance.

A further purpose is to provide a generally aligned fabric engaging surface on the plush point which brings the heel of the plush point into parallelism or within 25 degrees of parallelism of the adjoining side of the trick plate (that is diverging with the forward end of the plush point closer to the line of the trick plate), while at the same time providing diverging cutters on the front of the plush points which will cut the loop.

A further purpose is to utilize teeth on the rear of the plush point to pull the fabric down when the plush point moves down and counteract the tendency of the needles to displace the fabric forwardly.

A further purpose is to mount hooks on the cutter side of the forward end of the cutting plush point to prevent unintended casting off at the completion of the stitch.

A further purpose is to provide a lateral hook on the front end of the cutting plush point at the side opposite to the cutting blade to prevent the parn from unintentionally coming off the plush point when the guide bars are forward after shogging has taken place.

A further purpose is to make the hook on the cutter side larger than the hook on the opposite side to the cutter.

A further purpose is to employ the sinker comb to accomplish a beating up action on the fabric, bringing the sinker across within the group of plush points before the plush points advance and keeping the sinker comb within the group of plush points and across the trick plate and the newly forming fabric until just before the plush points retract.

Further purposes appear in the specification and in the claims.

In the drawings I have chosen to illustrate a few only of the numerous embodiments in which the invention may appear, choosing the forms shown from the standpoints of convenience in illustration, satisfactory operation and clear demonstration of the principles involved.

Figures 1 to 8 inclusive are fragmentary diagrammatic stepwise end elevations together showing a complete cycle of knitting in accordance with the invention, the angular positions of the different views throughout the cycle with respect to the main shaft being as follows: Figure 1, 0 degrees or 360 degrees; Figure 2, 30 degrees; Figure 3, 90 degrees; Figure 4, 150 degrees; Figure 5, 210 degrees; Figure 6, 270 degrees; Figure 7, 300 degrees; Figure 8, 330 degrees.

Figures 1a, 3a, 4a, 5a, 6a, and 8a are diagrammatic top plan views corresponding respectively to the positions of Figures 1, 2, 4, 5, 6 and 8, showing the manipulation of the yarn which has been accomplished at the particular step, in accordance with the invention.

Figure 9 is a fragmentary enlarged plan view showing the formation of the completed fabric in accordance with the invention.

Figure 12 is a side elevation showing a preferred embodiment of the cutting plush point of the invention, slightly modified from the form shown in Figures 1 to 8 inclusive, and the mounting.

Figure 13 is a top plan view of the cutting plush point of Figure 12.

Figure 14 is a side elevation of the cutting plush point of Figure 12 omitting the mounting.

Figure 15 is a front elevation of the cutting plush point of Figures 12 to 14.

Figure 16 is a diagrammatic side elevation of the swing bar cam on the rear drive shaft at the left side of the warp knitting loom according to the invention.

Figure 17 is a side elevation of the plush point cam utilized on the front drive shaft at the right side of the warp knitting loom according to the invention.

Figure 18 is a side elevation of the needle bar cam used on the rear drive shaft at the left side.

Figure 1:
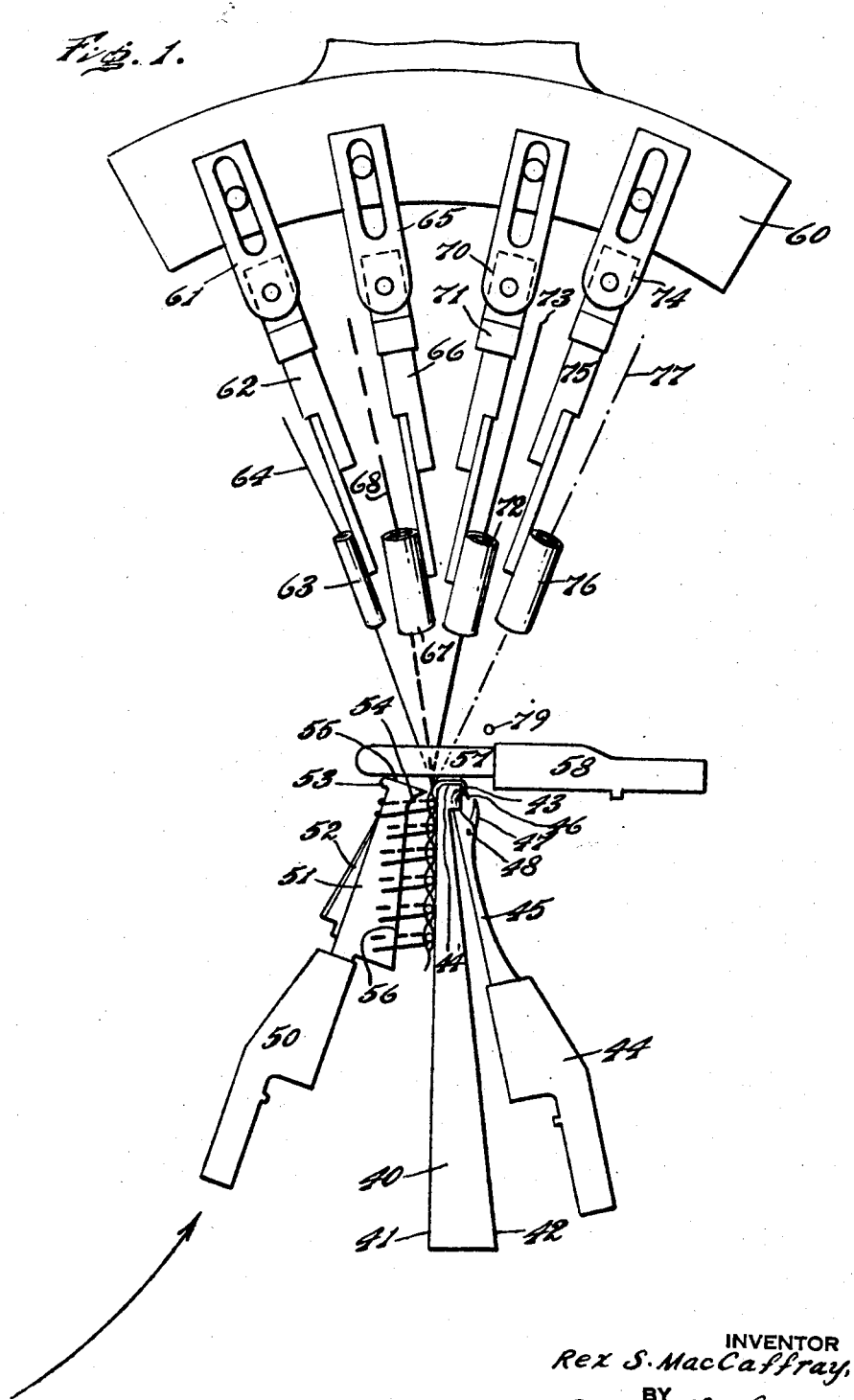

Describing in illustration but not in limitation and referring to the drawings:

Considering now the drawings, and with special reference to Figures 1 to 8 and 1a, 3a, 4a, 5a, 6a, and 8a, the knitting procedure according to the invention will first be described by reference to the actual operating elements, later considering the drives therefor.

A stationary vertically extending trick plate 40 as well known in the art in looms of this character is generally of tapered cross section, with a side 41 extending generally vertically and engaging the fabric being formed and removed by a take-off mechanism, and a side 42 suitably slightly converging and adjoining the needles. The trick plate at the top has a suitably notched needle guiding comb portion 43 and a blunt top 44' shown in Figure 1 beneath the level of the sinkers, to be described.

The warp knitting loom employed is suitably of the double needle bar type, one needle mounting supports 44 for a series of latch needles 45, as well known, which extend vertically and are guided by the trick plate. The latch needles, as shown in Figure 1, have hook ends 46 at the top directed away from the trick plate and latches 47 pivoted at 48 and in one position closing against the hook ends.

The other needle bar in the device of the invention on the opposite side of the trick plate is equipped with plush points instead of needles and an important feature of the present invention is the structure and operation of the plush points.

In one embodiment of the invention cutting plush points 51 on mountings 50 are used at each needle position across the machine as generally shown more in detail in Figures 12 to 15, and the cutting plush points having cutting knives 52 on the side remote from the trick plate, the cutting knives being directed like a wedge, at an angle which diverges from the line of motion of the plush points shown by the arrow in Figure 1. A nose hook 53 is provided on the upper end of the plush point on the side adjoining the cutting knife at the top, a nose hook 54 is on the side adjoining the trick plate at the top, there is a suitably blunt top 55 and there is a heel 56 along the side toward the trick plate which generally conforms to or is parallel with the adjoining side of the trick plate and in any case diverges therefrom not more than 25 degrees (that is, closer to the trick plate at the forward end of the plush point than at the less advanced end).

In the preferred form, the hook 53 protrudes from the plush point more than the hook 54.

In the preferred embodiment as shown, the knife 52 is suitably of the character of a safety razor blade inserted into a slot in the plush point and having its cutting edge extending diagonal to the line of motion of the plush point and to the axis of the trick plate.

Positioned immediately above the trick plate and adapted to move across it is a sinker comb 57 mounted on sinker supports 58 on a sinker bar, as well known.

In the prior art cut pile fabrics have been knitted on warp knitting looms such as the Raschel but difficulty has been encountered due to the tendency of the cutting plush points to cause distortion of the fabric, injury to needles, and damage to the machine.

I have discovered that this difficulty can be largely avoided by holding the fabric which has just been formed against the trick plate when the plush points are raised so that the fabric is not likely to pull the needles forward or to bend the needles. This action is accomplished in accordance with the invention by providing frictional engaging surfaces on the backs of the plush points, such surfaces preferably being practically in parallelism with the trick plate when the plush points advance, and in any case deviating from the adjoining side of the trick plate in the direction toward the axis of the plush point not more than 25 degrees.

In the preferred embodiment I also provide teeth on the rear of the plush point which tend to hold the fabric down when the plush point moves down so as to counteract the tendency which the needles exert to pull the fabric up, especially when the pile yarn is dense or heavy and the cutting loads on the plush points are large.

To further improve the knitting, I provide, on the preferred plush point, hooks at the forward end on the front side which prevent unintended casting off of the pile yarn when the plush point retracts.

I further provide in the preferred embodiment a hook at the forward end of the cutting plush point on the rear side, which prevents the yarn from coming off of the plush point when the guides are at the front after shogging takes place.

With heavier fabrics, more anchorage of the fabric is desirable, and I find that this can to advantage be accomplished by changing the sinker comb motion, placing the sinker comb across the newly forming fabric and across the trick plate and across the plush points before the plush points advance and desirably holding it there until just before the plush points and needles retract.

Suitably positioned above the sinkers and extending clear across the machine is a swing bar 60 which carries suitably positioned thereon in order from front to back a horizontal slidable mounting 61 for a knitting yarn guide bar 62 which carries a series of eyes or tubes 63, one for each knitting yarn end 64; then a horizontal slidable mounting 65 for a first face yarn guide bar 66 which carries a series of eyes or tubes 67, one for each first face yarn end 68; next toward the back there is a horizontal sliding support 70 which supports in slidable relation a second face yarn guide bar 71, which carries eyes or tubes 72, one for each second face yarn end 73; and finally at the rear there is a horizontal sliding support 74 which mounts in sliding relation a backing yarn guide bar 75 which carries a series of eyes or tubes 76, one for each backing yarn end 77. A latch wire 79 extends across the back of the machine.

For convenience in understanding the knitting procedure, the second set of pile yarn ends (which is optional) has been omitted in Figures 1a, 3a, 4a, 5a, 6a, 8a, and 9.

Figure 10:
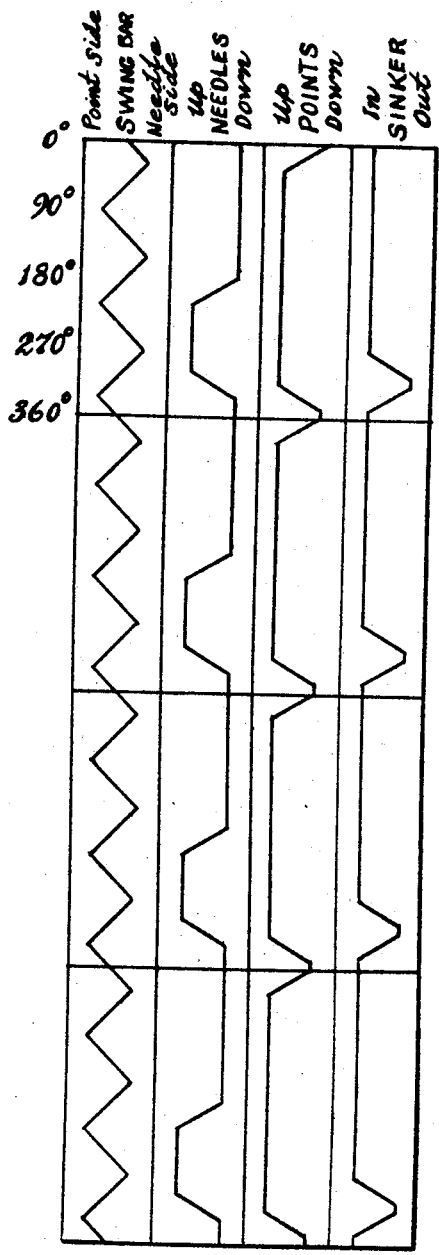
Figure 10 is a cam diagram showing the cam throws and the positions of the various moving parts throughout the cycle, in accordance with the invention.

Let us consider now Figures 1 to 8, in connection with Figure 10, the cam diagram. In Figures 1 and 1a, which correspond to zero degrees or 360 degrees, the first step is being taken after the completion of the last stitch. The needles 45 and the plush points 51 are down or retracted, the sinker comb 57 is advanced or forward, and the swing bar 60 with the guide bars 62, 66, 71 and 75 are in midposition and moving back. Where desired in the fabric design the guide bars shog in either direction any reasonable distance at this position. Actually it is unimportant to the present invention whether shogging is accomplished at this point or at one of the other points as later mentioned.

Figure 2 corresponds to 30 degrees of advance in the cycle. The position of the needles and of the sinkers is the same as in Figure 1. The guide bars are all the way back out of line with the needles and plush points, and the plush points have just completed their forward or upward motion, the knives 52 on the plush points cutting the previous pile loops which were wrapped around the upper end of the plush points by the previous stitch.

It will be evident that the special configuration of the plush point is of great assistance. The cutting blades diverge from the line of the adjoining side of the trick plate more pronouncedly in the direction from the forward end to the rearward end of the plush points. The cutter actually diverges from the axis of the body of the plush point in the direction from the forward end toward the shank. Also as mentioned more in detail below, the heel side of the plush point has a frictional engaging surface which diverges from the direction of motion of the plush point toward the trick plate and which in forward position of the plush point achieves an angle preferably of parallelism but suitably with a maximum divergence of 25 degrees between the lower portion of the heel side of the plush point and the adjoining side of the trick plate.

The fabric is held against upward motion at this point and also given a beat up or densifying push by the lower edge or heel of the sinker comb which extends across the end of the fabric at the fell. This assures that the fabric cannot move with the plush points and therefore cannot damage the needles. This hold-down action of the sinker comb is an important feature of the present invention.

Figures 3 and 3a correspond to the position at 90 degrees in the cycle. The swing bar and the guide bars with it move to the front past the raised plush points and the face yarn guide bars now shog in the preferred embodiment in either direction so that in the next succeeding step loops will be formed around the plush points engaging in the forwardly directed hook portions beneath the hooks 53 above the cutting knives. The formation of such a loop by shogging is shown at 78 in Figure 3a.

At 150 degrees in the cycle, as shown in Figures 4 and 4a, the swing bar has moved back, carrying with it the guide bars, while the positions of all of the other elements remain the same. Face yarn guide bars 66 and 71 now shog in the preferred embodiment, wrapping the face yarn around the back of the plush points in the hook portion 54. In Figure 4a the face yarn end 68 is shown shogging at 80 and the backing yarn end 77 is shown shogging at 81. The shogging of the face yarn guide bars isolates the face loops around the plush points so that, when the knitting stitch is later formed, the face loops or tufts will be held between two rows of knitting stitches. The shogging of the backing yarn 77 at Figures 4 and 4a lays in the backing yarn. In the preferred embodiment backing yarn is laid in by shogging the backing yarn guide bar at the position of Figure 1 and also the position of Figure 4, although laying in of backing yarn by shogging can be done at either of these positions.

Hook portion 54 at the non-cutting side of the plush point functions to prevent face yarn from coming off the top of the plush point during shogging.

The position of Figures 5 and 5a, at 210 degrees in the cycle, corresponds to the completion of all shogging except for the knitting yarn. The face yarn and the knitting yarn guide bars have moved forward past the plush points. Depending on the shogging positions, face yarn ends 68 have formed loops 82 (Figure 5) around plush points and face yarn ends 73 have formed loops 83 around plush points. The needles 45 have advanced or raised and the latches 47 of the needles have been opened by the previous knitting stitch as shown at 84, while the previous knitting stitch 84 has moved down on the needle below the latch, leaving the hook of the needle open as shown.

The hooks 54 on the plush points opposite to the cutter prevent the yarn from coming off the plush points in the position of Figure 5.

The position of Figures 6 and 6a corresponds to 270 degrees in the cycle. This position shows all guide bars moved back of the plush points and the needles, with the new stitch ready to be formed when it enters the hook of the needles in the next step. The face yarn ends 68 are now formed in loops 85 as shown in Figure 6a and the backing yarn 77 is now laid in in stretch 86 as shown in Figure 6a, and the knitting yarn guide bar is now shogged to wrap the knitting yarn around the needles beneath the hooks and above the latches, forming loops 87 as shown in Figure 6a.

Figure 7 at 300 degrees in the cycle, shows the guide bars moving to the front and midway in their swing. The sinker comb 57, which has been in position across the fell and across the end of the trick plate and among the plush points, is now retracted to clear the ends of the needles, the needles are beginning to retract and the latch is closed by the previous stitch, and the plush points are retracting. The previous stitches are now allowed to be cast off as the needles retract. Actually the casting off takes place between the step of Figure 7 and the step of Figure 8, and once the stitch is cast off, the previous face loop or loops are fully bound at both ends so that the tufts will be bound after the fabric is cut.

Figure 8, corresponding to 330 degrees, shows the stitch completed and locked. The sinker comb is fully retracted and is now about to advance again to the position of zero or 360 degrees (Figure 1). The face yarn loops are still around the plush points and the face yarn loops remain uncut around the plush points until the plush points advance at the position of Figure 2 in the next cycle. A completed face yarn loop is shown at 87 in Figure 8a, which is bound by the stitch at shown at 88.

It will be understood that, in some fabrics, the loops will not cut the first time the plush points advance after the stitch is formed, but several completed and bound loops may remain on the plush points pushing one another down in succession until finally the taper or wedge action of the plush points brings the knife to bear and cuts the loops. The tightness of the fabric, the diameter of the yarn and the tension will influence the question of whether the first bound loop will be cut, or whether cutting will not take place until successive stitches have been taken.

It will be evident that in accordance with the invention, it is possible to weave very heavy fabrics on the warp knitting machine, fully comparable with those woven on shuttle looms, and without frequent damage either to the needles or to the fabric.

The fabric position is very accurately controlled by the heel portion of the plush point which is either parallel to the trick plate or within an angle of 25 degrees to the adjoining face of the trick plate (closer at the forward end of the plush point) so that the fabric does not pull up when the plush points advance. The heel wedge on the back of the plush point thus performs an important function as it prevents bending the needles when the plush points rise.

The hook on the cutter side of the plush point prevents unintended casting off at the position of Figures 1, 7 and 8 when the plush point retracts. The hook on the side opposite to the cutter functions particularly in the position of Figure 5 to prevent yarn coming off the plush points after shogging when the carrier moves to the front.

A much tighter fabric is secured by the beat up action due to the presence of the sinker comb against the newly formed fabric when the plush points advance, performing in this respect some of the functions which the lay performs in shuttle weaving. The sinker comb is only out of its forward position long enough to permit the needles to retract.

The finished fabric of the invention is illustrated in Figure 9, where backing yarn is shown laid in at 90, and the face loop 87 has been severed into tufts 87' bound in the fabric by knitting stitches 91.

The warp knitting loom of the invention may be as described in D. F. Paling, Warp Knitting Technology (1952), chapter 11, Raschel Warp Looms, and chapter 12, Raschel Warp Loom Mechanism, with slight modifications as described herein and as shown particularly in reference to Figures 11, 20, 21 and 22.

Figure 11:
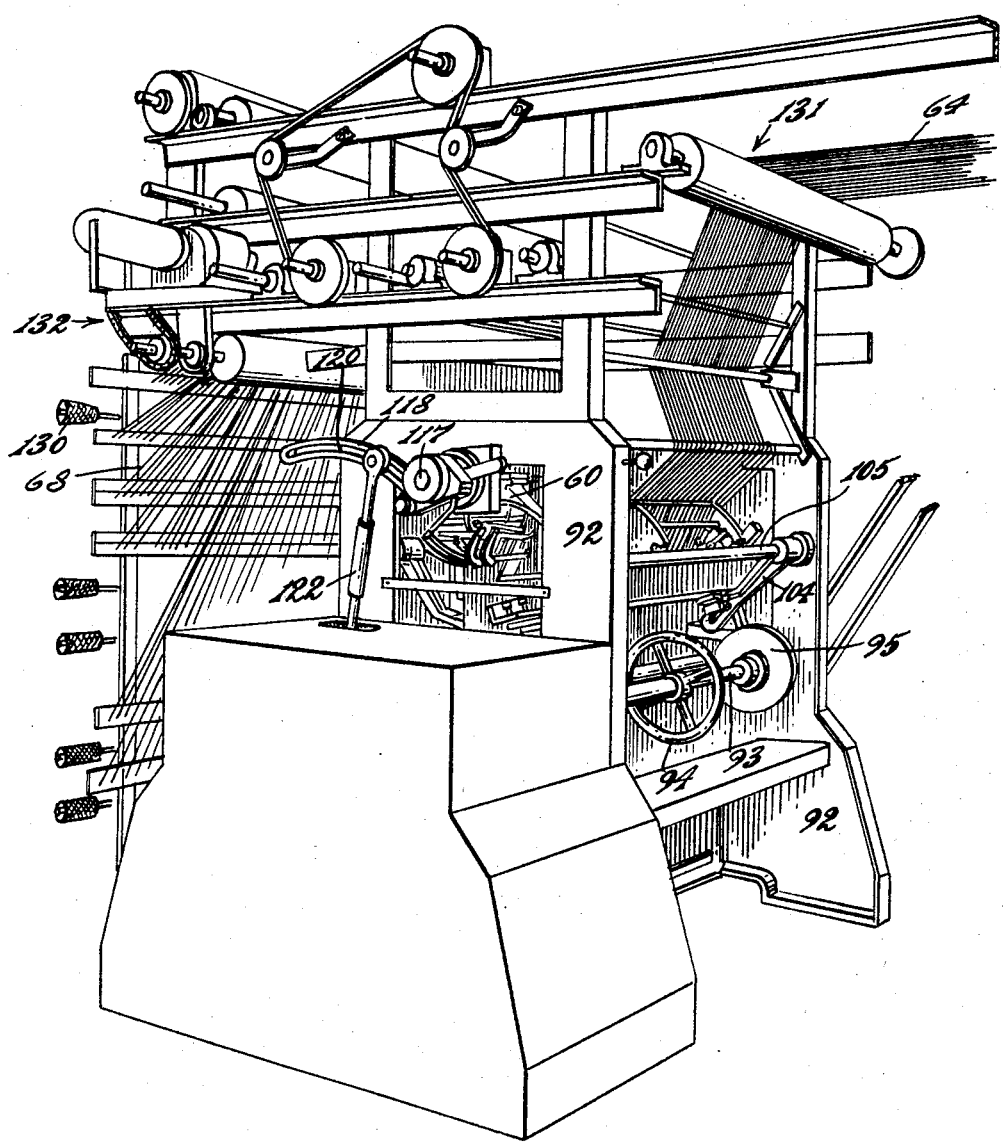
Figure 11 is a fragmentary diagrammatic front elevation of warp knitting machine, in accordance with the invention, illustrating the general structure for placement purposes.

As well known in the art, the machine of Figure 11 has a frame 92 which journals a suitably driven front drive shaft 93, having a hand wheel 94, carrying a plush point drive cam 95 best seen in Figure 17, which has a cam track 96 receiving a cam follower 97 which pivotally connects to the free end of a lever 98 having fixed pivot on the frame at 100. The pivotal connection of the follower 97 also pivotally connects to one end of a link 101, which at the far end has a pin 102 which adjustably pivotally connects in an arcuate slot 103 on plush point arm 104 which is keyed on plush point bar shaft 105 journaled in the frame.

The plush point cam 95 conforms to the cam layout set forth in Figure 10.

The needle operating mechanism is not shown in Figure 11 as it is at the back of the machine, but it is identical in principle with the plush point operating mechanism already described, and is detailed in Figure 18, where a rear drive shaft 105 journaled in the frame mounts a needle bar cam 106 having a track 107 which receives a follower 108 pivotally connected to one end of an arm 110 having fixed pivotal mounting on the frame at 111. The follower 108 also pivotally connects to one end of a link 112 which at the other end has a pin 113 adjustably pivotally connecting in an arcuate slot 114 in the outer end of needle arm 115 which is keyed on needle bar shaft 116 journaled in the frame. The layout of cam 106 is shown in Figure 10.

Above the plush points and needles, swing bar shaft 117 extends across the machine journaled in the frame and carries swing bar 60 carrying the guide bars as well known in the art. The guide bars are shogged by the pattern control mechanism of the character shown in Paling above, beginning at page 145.

The swing bar has secured thereto at one end swing bar arm 118 having an arcuate adjustment slot 120 which receives an adjustment stud 121, which pivotally connects to one end of an adjustable link 122, which at the other end has a follower 123 which engages in cam track 124 of swing bar cam 125 operating on swing bar cam shaft 126 and driven by gearing 127. Loosely pivoted on one of the gear shafts is one end of link 128, the other end of which pivotally connects to the cam follower 123. The lay-out of the swing bar cam is shown in Figure 10.

The sinker comb mechanism will be that of the prior art, with the sinker bar cam lay-out as in Figure 10.

The face yarn is taken to the appropriate guide bars from creel 130. The knitting yarn is brought in over the feed mechanism 131 and the backing yarn 77 is brought in by feed mechanism 132 as well known in the art.

The form of plush point shown in Figures 12 to 15 is particularly desirable in the present invention, as the heel 56 has serrations or teeth 132, whose abrupt or gripping portions 133 are directed downwardly.

These teeth tend to hold on the fabric when the plush point is moving down to counteract the tendency of the needles to pull the fabric upward. It will be evident that in accordance with the invention a back wedge is provided on the plush point which holds the fabric and prevents lateral pull on the needles when the plush point is raised.

The rear of the plush point is also provided with teeth in the preferred embodiment, which act downwardly and tend to prevent the possibility that the needles will force the fabric up. This is especially desirable on very heavy fabric.

The sinker is provided in accordance with the invention to act as a beat up device, going forward before the plush point advances and staying forward until just before the needles and plush point go down. This causes support of the fabric when the plush point comes up to prevent raising the fabric or tearing the needles due to pull of uncut loops on the plush point.

It will also be evident that I provide a hook on the side, which at the position of Figure 6, prevents casting off the loops, and a hook on the noncutting side of the plush point which at the position of Figure 5 prevents the yarn from coming off the plush point.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A cutting plush point having a shank, having a forward end, and having a body between the forward end and the shank, a cutter blade on one side of the body diverging from the axis of the body in the direction from the forward end toward the shank, a frictional gripping surface on the opposite side of the body diverging from the axis in the direction from the forward end toward the shank, a forward and lateral hook of the forward end at the side adjoining the cutter blade and a forward and lateral hook at the forward end on the side remote from the cutter blade.

2. A cutting plush point of claim 1, in which the hook on the side adjoining the knife is larger than the hook on the side remote from the knife.

References Cited in the file of this patent

UNITED STATES PATENTS

| | | |
|---|---|---|
| 1,924,649 | Morton | Aug. 29, 1933 |
| 2,196,471 | Moody et al. | Apr. 9, 1940 |